US011679712B2

(12) United States Patent
Watson

(10) Patent No.: US 11,679,712 B2
(45) Date of Patent: Jun. 20, 2023

(54) RETRACTABLE VEHICLE LIGHT ASSEMBLIES FOR TAILGATES

(71) Applicant: Toyota Motor Engineering & Manufacturing North America, Inc., Plano, TX (US)

(72) Inventor: Skylar C. Watson, Williamston, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/218,995

(22) Filed: Mar. 31, 2021

(65) Prior Publication Data

US 2022/0314875 A1    Oct. 6, 2022

(51) Int. Cl.
| B60Q 1/26 | (2006.01) |
| B60Q 1/30 | (2006.01) |
| F21V 21/30 | (2006.01) |
| F21V 23/04 | (2006.01) |
| F21V 15/01 | (2006.01) |
| F21W 107/10 | (2018.01) |

(52) U.S. Cl.
CPC .......... *B60Q 1/2692* (2013.01); *B60Q 1/302* (2013.01); *F21V 15/01* (2013.01); *F21V 21/30* (2013.01); *F21V 23/0492* (2013.01); *F21W 2107/10* (2018.01)

(58) Field of Classification Search
CPC ....... B60Q 1/2692; B60Q 1/302; F21V 15/01; F21V 21/30; F21V 23/0492; F21W 2107/10
See application file for complete search history.

(56) References Cited

U.S. PATENT DOCUMENTS

| 4,628,417 A * | 12/1986 | Kaminski | B60Q 1/2692 |
| | | | 362/523 |
| 4,707,014 A * | 11/1987 | Rich | B60Q 1/2611 |
| | | | 296/180.1 |
| 5,144,538 A * | 9/1992 | Harris | B60Q 1/305 |
| | | | 70/237 |
| 5,171,083 A * | 12/1992 | Rich | B60Q 1/2611 |
| | | | 362/418 |
| 5,696,484 A * | 12/1997 | Kim | B60Q 1/2692 |
| | | | 340/471 |
| 6,786,623 B2 * | 9/2004 | Snyder | B60Q 3/30 |
| | | | 362/543 |
| 6,799,873 B2 * | 10/2004 | Fox | B60Q 1/44 |
| | | | 362/541 |
| 7,775,695 B1 * | 8/2010 | Rose | B60Q 1/2611 |
| | | | 362/543 |

(Continued)

FOREIGN PATENT DOCUMENTS

| KR | 200291442 Y1 | 10/2002 |
| KR | 20050023651 A | 3/2005 |
| WO | 2016076045 A1 | 5/2016 |

*Primary Examiner* — Tsion Tumebo
(74) *Attorney, Agent, or Firm* — Dinsmore & Shohl LLP

(57) ABSTRACT

A light assembly for a tailgate of a vehicle, including a housing, and a light source. The housing is pivotally coupled to the tailgate for movement of the housing between a use positon and a stowed position. The light source is coupled to the housing. In the use position the light source is positioned outside of the tailgate. In the stowed position the light source is positioned within the tailgate.

19 Claims, 3 Drawing Sheets

(56) References Cited

U.S. PATENT DOCUMENTS

| | | | | |
|---|---|---|---|---|
| 8,854,201 | B1* | 10/2014 | Hertz | B60Q 1/305 |
| | | | | 340/468 |
| 9,291,324 | B2* | 3/2016 | Huebner | F21S 43/00 |
| 9,849,830 | B1* | 12/2017 | Salter | B60Q 3/30 |
| 10,011,223 | B1 | 7/2018 | Salter et al. | |
| 10,029,611 | B2* | 7/2018 | Harris | B60Q 1/0005 |
| 10,246,006 | B1* | 4/2019 | Stowell | B60Q 1/2669 |
| 10,807,518 | B2* | 10/2020 | Miranda Nieto | B60Q 1/307 |
| 11,193,634 | B2* | 12/2021 | Chien | F21V 14/02 |
| 2003/0063547 | A1* | 4/2003 | Huang | G11B 33/121 |
| 2012/0068492 | A1* | 3/2012 | Lucas | B60R 7/02 |
| | | | | 296/37.1 |
| 2015/0062929 | A1* | 3/2015 | Mostoller | F21V 23/06 |
| | | | | 362/363 |
| 2018/0072219 | A1* | 3/2018 | Harris | B60Q 1/307 |
| 2018/0304805 | A1 | 10/2018 | Villacres Mesias et al. | |

* cited by examiner

RETRACTABLE VEHICLE LIGHT ASSEMBLIES FOR TAILGATES

TECHNICAL FIELD

The present specification generally relates to light assemblies for vehicles and, more specifically, retractable light assemblies for vehicle tailgates.

BACKGROUND

Vehicles require the area around the vehicle to be illuminated for tasks such as moving in reverse, or walking around the vehicle. However, there are limited areas that a light for illuminating an area around the vehicle may be provided. Additionally, a light that is constantly exposed in the rear of the vehicle may provide an undesirable aesthetic.

Accordingly, a need exists for a retractable light assembly that may be stowed within a tailgate of a vehicle.

SUMMARY

A light assembly for a tailgate of a vehicle, including a housing, and a light source. The housing is pivotally coupled to the tailgate for movement of the housing between a use positon and a stowed position. The light source is coupled to the housing. In the use position the light source is positioned outside of the tailgate. In the stowed position the light source is positioned within the tailgate.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
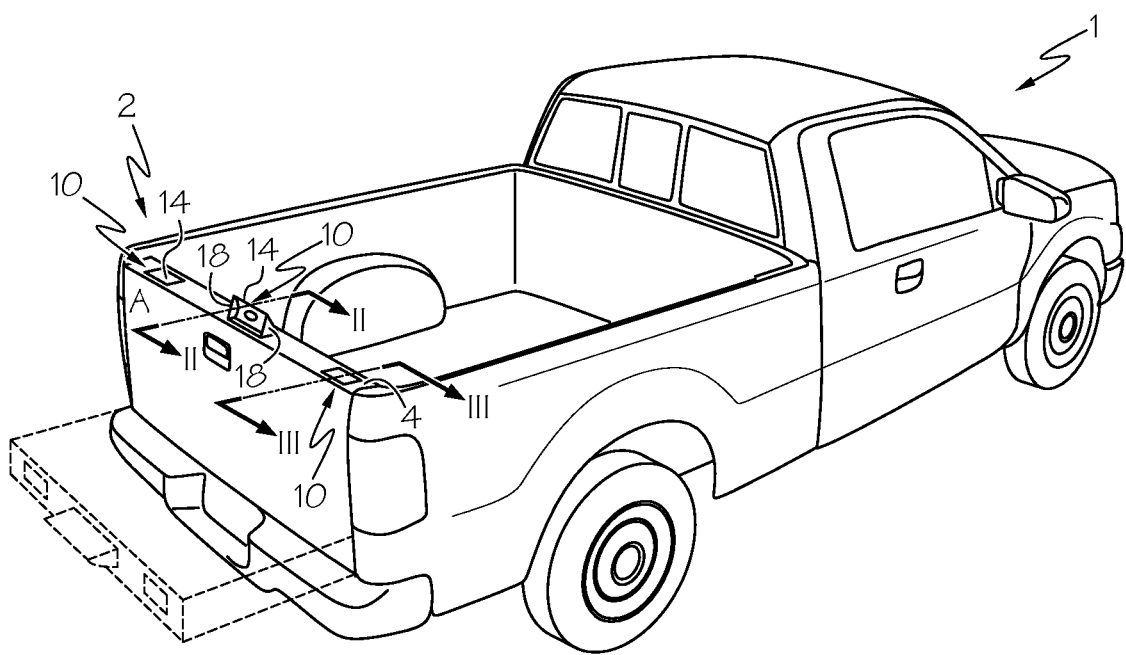
FIG. 1 schematically depicts a perspective view of a pickup truck with retractable light assemblies coupled to a tailgate, according to one or more embodiments shown and described herein.

Embodiments described herein are directed to a retractable light assembly for a tailgate. The retractable light assembly pivots between a stowed position and a use position. In the stowed position, the retractable light assembly is positioned within the tailgate. The light assembly includes a housing, a pivot mechanism coupling the housing to the tailgate, a light source coupled to the housing, and a locking mechanism. Various embodiments of the light assembly and the operation of the light assembly are described in more detail herein. Whenever possible, the same reference numerals will be used throughout the drawings to refer to the same or like parts.

Figure 2:
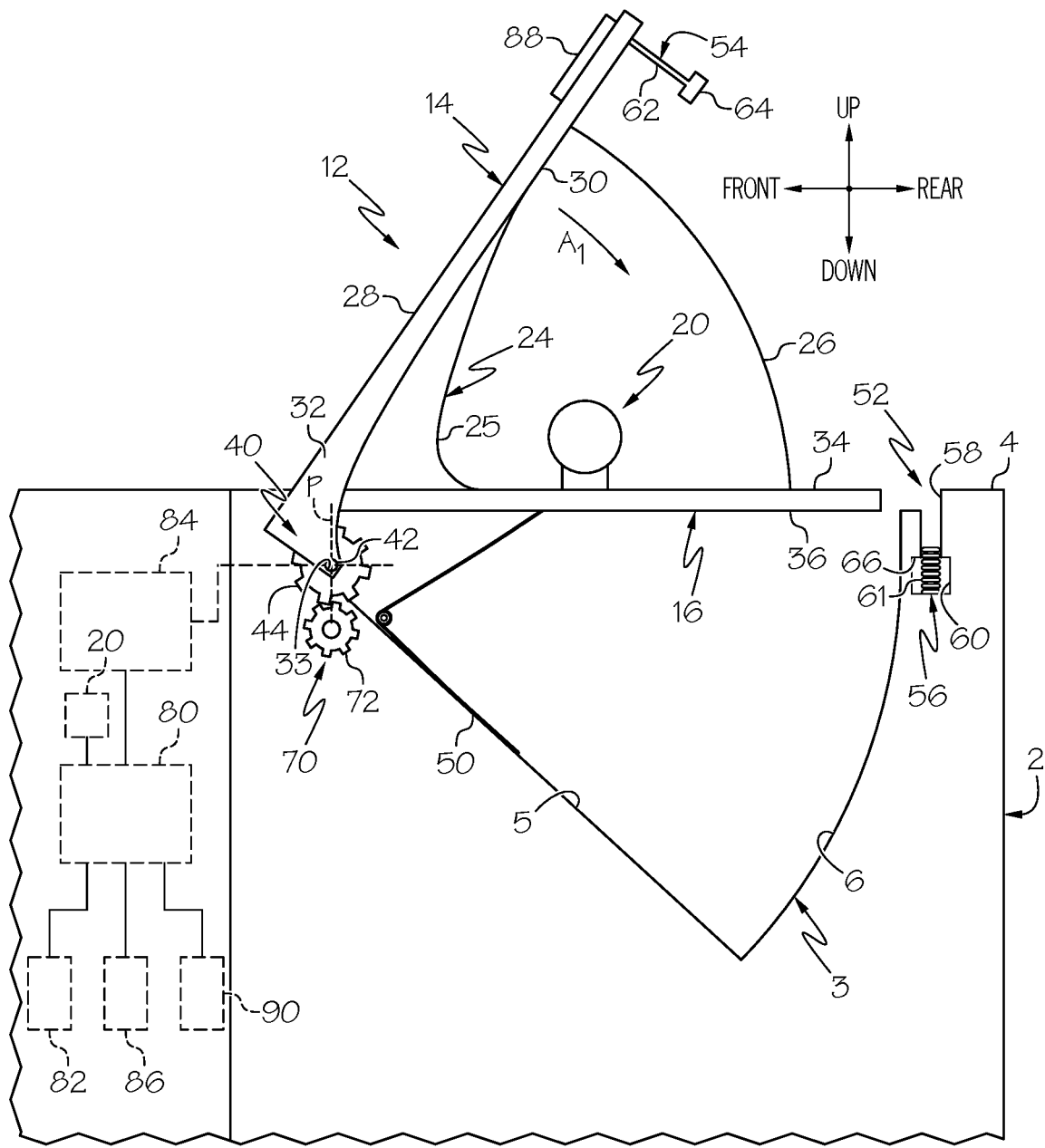
FIG. 2 schematically depicts a cross-sectional side view II-II taken along the line of the light assembly of FIG. 1 in a use position, according to one or more embodiments shown and described herein.
Figure 3:
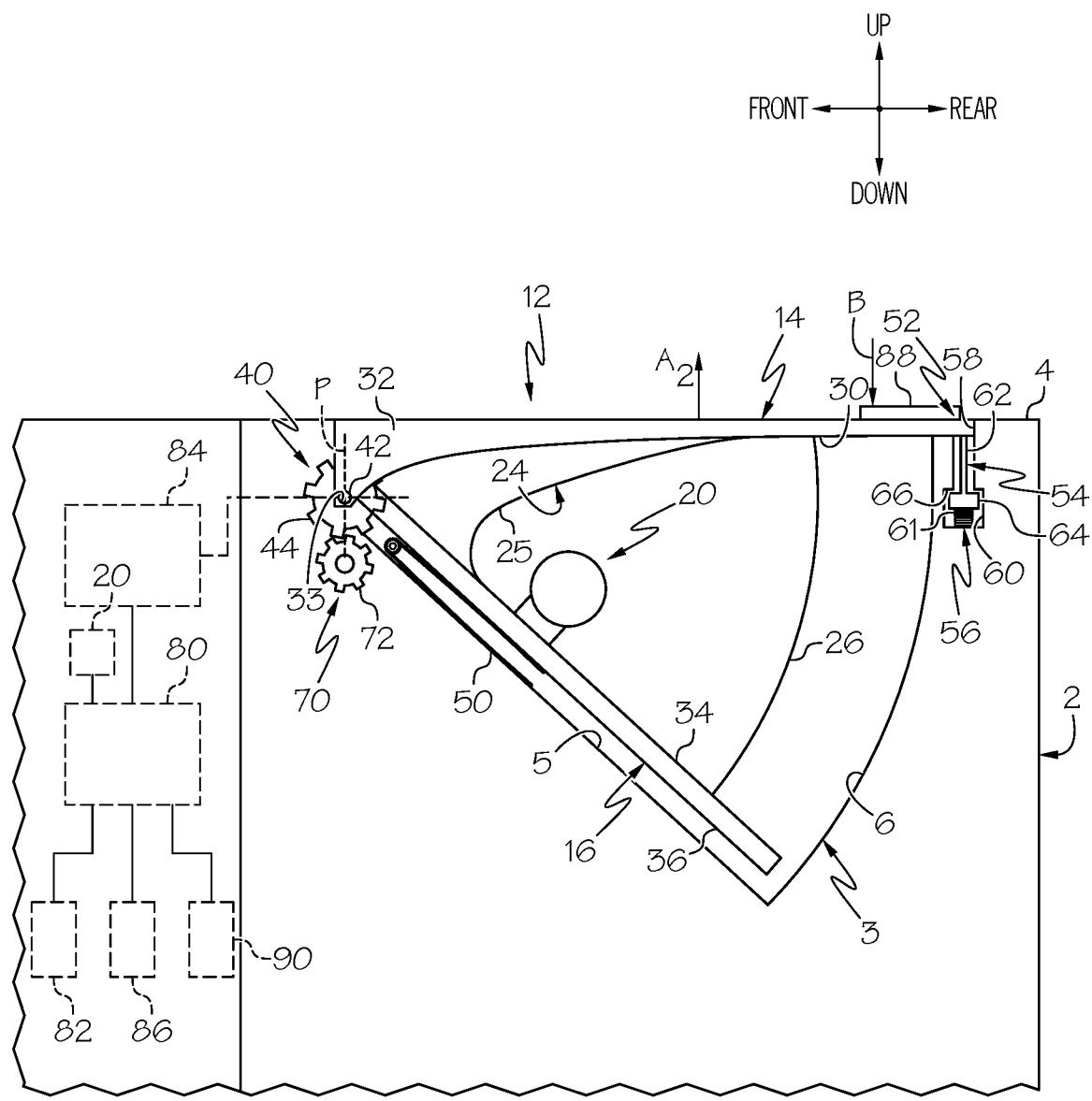
FIG. 3 schematically depicts a cross-sectional side view of the light assembly taken along the line III-III of FIG. 1 in a stowed position, according to one or more embodiments shown and described herein.

Referring now to FIG. 1, a pickup truck 1 including a tailgate 2 and retractable light assembly 10 coupled to the tailgate 2 is illustrated according to one or more embodiments described herein. The tailgate 2 may act similarly to a traditional tailgate, where the tailgate 2 may be pivoted between an up position and a down position (shown in phantom). The tailgate 2 may include a cavity 3 (FIG. 2) for stowing the retractable light assembly 10. The retractable light assembly 10 pivots between a use position (FIG. 2) and a stowed position (FIG. 3). The retractable light assembly 10 may be provided in the tailgate 2 such that the retractable light assembly 10 protrudes from a top surface 4 of the tailgate 2 in the use position (FIG. 2). The retractable light assembly 10 may be in the use position when the tailgate is in the up position and the down position.

In embodiments, a plurality of retractable light assemblies 10 are provided across the top surface 4 of the tailgate 2. The retractable light assembly 10 may be positioned in a center of the tailgate 2 in a vehicle width direction. The retractable light assembly 10 may alternatively be positioned toward a side of the tailgate 2, away from the center, in the vehicle width direction.

Referring to FIGS. 1 and 2, the retractable light assembly 10 may generally include a housing 12, a light source 20, and a lens 26. The housing 12 may include an exterior wall 14, an interior wall 16, and a pair of side walls 18 extending between the exterior wall 14 and the interior wall 16. The exterior wall 14, the interior wall 16, and the side walls 18 may be formed together, such that the housing 12 is integrally formed as a one piece monolithic structure. The exterior wall 14, interior wall 16, and side walls 18 may alternatively be formed separately and coupled together by a joining process, such as welding, adhesive, bolts, or the like. The housing 12 may be made of at least one material, including plastic, resin, metal, PVC, or the like.

The lens 26 may enclose the light source 20 within the housing 12 to protect the light source 20 from the environment. The lens 26 may extend from the exterior wall 14 to the interior wall 16. The lens 26 may additionally extend between the pair of side walls 18. The lens 26 may be made of a transparent or translucent material, such as glass, plastic, or the like.

Referring now to FIG. 2, the retractable light assembly 10 is depicted in the use position. The housing 12 may be pivotably coupled to the tailgate 2. The housing 12 may pivot between the use position and the stowed position. In the use position, the light source 20 may be positioned outside of the tailgate 2, where the light source 20 illuminates an area around the tailgate 2. In the stowed position, the light source 20 may be positioned within the cavity 3 of the tailgate 2.

The cavity 3 in the tailgate 2 for stowing the retractable light assembly 10 may be defined by a frontward surface 5 and a rearward surface 6. The frontward surface 5 may be obliquely angled away from the rearward surface 6. The rearward surface 6 may be curved to accommodate the movement of the housing 12.

The exterior wall 14 of the housing 12 may include an exterior surface 28, an interior surface 30 opposite the exterior surface 28, and a mounting protrusion 32 extending perpendicularly from the interior surface 30. The mounting protrusion 32 may include an aperture 33 extending therethrough. The interior wall 16 may include an outer surface 34 and an inner surface 36. The exterior wall 14 of the housing 12 may be obliquely angled away from the interior wall 16. An angle between the exterior wall 14 and the interior wall 16 may be substantially the same as an angle between the frontward surface 5 of the cavity 3 and the top surface 4 of the tailgate 2.

The light source 20 may further include a reflector 24. The light source 20 may be coupled to the outer surface 34 of the interior wall 16, where the light source 20 is positioned between the exterior wall 14 and the interior wall 16. In embodiments, the light source 20 may be coupled to the interior surface 30 of the exterior wall 14. The reflector 24 may include a reflective surface 25. The reflective surface 25 may be curved to direct and focus reflected light illuminated from the light source 20. However, the reflective surface 25 may include any shape that directs or focuses reflected light. The reflective surface 25 may be convex, where the convex surface faces the light source 20. The reflector 24 may be positioned between the light source 20 and the housing 12, where the concave curved surface directs light from the reflector 24 out of the housing 12.

The housing 12 may be pivotally coupled to the tailgate 2 by a pivot mechanism 40. The pivot mechanism 40 may include a pivot shaft 42, and a pivot gear 44. The pivot shaft 42 may pivot about a pivot axis P. The pivot mechanism 40 may be coupled to the mounting protrusion 32, where the pivot shaft 42 extends through the aperture 33 formed within the mounting protrusion 32. The pivot shaft 42 may additionally be coupled to the tailgate 2, such that the housing 12 may pivot relative to the tailgate 2. The housing 12 may pivot about pivot axis P in the A1 direction and the A2 direction (FIG. 3). The pivot gear 44 may be coupled to the pivot shaft 42 such that the pivot gear 44 pivots with the housing 12.

The pivot mechanism 40 may further include a damping mechanism 70. The damping mechanism 70 may include a damping gear 72 rotatably coupled to the tailgate 2. The damping gear 72 may be in contact with the pivot gear 44, such that rotation of the pivot gear 44 rotates the damping gear 72. The damping gear 72 is configured to damp the movement of the housing 12 between the use position and the stowed position by resisting the rotation of the pivot mechanism 40. In embodiments, the damping gear 72 is positioned in a viscous fluid that provides rotational resistance when the damping gear 72 rotates. In embodiments, the damping gear 72 may increase the inertia of the pivot mechanism 40, thereby resisting the rotation of the pivot gear 44 and housing 12.

A housing biasing member 50 may be positioned between the inner surface 36 of the interior wall 16 and the frontward surface 5 of the cavity 3. The housing biasing member 50 may be coupled to the housing 12, where the housing biasing member 50 biases the housing 12 toward the use position.

Referring still to FIG. 2, the retractable light assembly 10 may further include a locking mechanism 52. The locking mechanism 52 may include a locking tab 54 and a locking cavity 56 that receives the locking tab 54. The locking tab 54 may extend perpendicularly from the interior surface 30 of the exterior wall 14. The locking cavity 56 may be formed so as to be recessed with respect to the top surface 4 of the tailgate 2. The locking cavity 56 is positioned to receive the locking tab 54 when the retractable light assembly 10 is in the stowed position. The locking cavity 56 may include a shaft-receiving portion 58 and a head-receiving portion 60. A width of the head-receiving portion 60 may be larger than a width of the shaft-receiving portion 58. The locking mechanism 52 may further include a lock biasing member 66 positioned within the locking cavity 56, where the lock biasing member 66 biases the locking tab 54 away from the locking cavity 56.

The locking tab 54 includes a shaft 62 and a head 64, where the head 64 may have a width that is larger than a width of the shaft 62. The head 64 is configured to elastically deform against the locking cavity 56, specifically, the shaft-receiving portion 58, such that the locking tab 54 may pass through the locking cavity 56. The locking tab 54 may be made of a material that can withstand repeated elastic deformations, such as rubber. The locking tab 54 may also be made of a material similar to the housing 12, where the locking tab 54 may be integrally formed as a one piece monolithic structure with the housing 12. The head 64 of the locking tab 54 may be formed separately from the shaft 62, where the head 64 and the shaft 62 are formed of separate materials.

The retractable light assembly 10 may further include an electronic control unit 80 (ECU), a position sensor 82, an actuator 84, and a vehicle state sensor 86. The ECU 80 may be in electrical connection with the light source 20, the position sensor 82, actuator 84, and vehicle state sensor 86. The actuator 84 may be configured to pivot the housing 12 between the use position and the stowed position. The actuator 84 may be coupled to the pivot mechanism 40, where the actuator 84 rotates the pivot gear 44. The actuator 84 may be coupled to the housing 12, where the actuator 84 moves the housing 12 between the use position and the stowed position. The actuator 84 may be one of a linear actuator, a rotational actuator, or the like.

The position sensor 82 may be configured to detect the position of the housing 12, specifically, whether the housing 12 is in the use position or the stowed position. The vehicle state sensor 86 may be configured to detect a vehicle state of the truck 1, such as the speed and/or a shift position of a transmission of the truck 1. For example, the vehicle state sensor 86 may determine whether the truck 1 is in a reverse position. Further, the vehicle state sensor 86 may determine whether the truck 1 is moving below a threshold speed, such as 10 miles per hour (MPH), 15 MPH, 25 MPH, 35 MPH, etc. The ECU 80 may be configured to control activation of the light source 20 based on outputs received from the position sensor 82 and vehicle state sensor 86. The ECU 80 may activate the light source 20 when the housing 12 is in the use position, and deactivate the light source 20 when the housing 12 is in the stowed position. The ECU 80 may additionally be configured to control actuation of the actuator 84 based on outputs received from the position sensor 82 and vehicle state sensor 86.

The retractable light assembly 10 may further include an input 88, where the input 88 activates the pivoting of the housing 12 between the use position and the stowed position. In embodiments, the input 88 may be a portion of the housing 12, where a user may press, shown as force B, the portion of the housing 12 to pivot the housing 12 from the use position to the stowed position. Specifically, the input 88 may be pressed when the housing 12 is in the stowed position, where the pressing of the input 88 moves the locking mechanism 52 from a locked state to an unlocked state. In the locked state, the locking tab 54 is positioned within the locking cavity 56, where the shaft 62 is positioned in the shaft-receiving portion 58 and the head 64 is positioned in the head-receiving portion 60. When in the locked state, the locking mechanism 52 inhibits movement of the housing 12 from the stowed position to the use position. In the unlocked state, the locking tab 54 is positioned outside of the locking cavity 56. When in the unlocked state, the locking mechanism 52 permits movement of the housing 12 from the stowed position to the use position, where the housing 12 may pivot between the stowed position and the use position.

When the input 88 is released, the locking mechanism 52 moves from the locked state to the unlocked state. Additionally, when in the use position, a user may press the input 88 to pivot the housing 12 from the use position to the stowed position. In embodiments, an electrical input 90, such as a button or a touch screen, may be in electrical connection with the ECU 80. The electrical input 90 may be configured to actuate the actuator 84 when the electrical input 90 is pressed by a user, thereby pivoting the housing 12 between the use position and the stowed position.

Referring now to FIG. 3, the retractable light assembly 10 is depicted in the stowed position. In the stowed position, the locking mechanism 52 is in the locked state. In the locked state, the lock biasing member 66 is compressed between the locking cavity 56 and the head 64 of the locking tab 54, where the lock biasing member 66 biases the head 64 away from the locking cavity 56. The head-receiving portion 60 of the locking cavity 56 includes an upper surface 61, where the lock biasing member 66 biases the head 64 in the vehicle upward direction to contact the upper surface 61. The contact between the head 64 and the upper surface 61 prevents the housing 12 from pivoting toward the use position. Further, the biasing forces from the lock biasing member 66 and the housing biasing member 50 is lower than a threshold force required to deform the head 64 against the locking cavity 56, where a force must be greater than the threshold force to move the locking mechanism 52 from the locked state to the unlocked state.

Referring still to FIG. 3, in the stowed position, the retractable light assembly 10 is substantially positioned within the cavity 3, where the light source 20 is positioned within the cavity 3. Additionally, the exterior wall 14 is positioned within the cavity 3 where the exterior surface 28 of the exterior wall 14 is co-planar with the top surface 4 of the tailgate 2. In other words, the exterior surface 28 of the exterior wall 14 may be flush with the top surface 4 of the tailgate 2. The housing biasing member 50 is compressed by the housing 12 when the housing 12 is in the stowed position, thereby biasing the housing 12 toward the use position.

Operation of the retractable light assembly 10 will now be described in reference to FIGS. 1-3.

When the retractable light assembly 10 is in the stowed position, a user may press the input 88, where pressing the input 88 further compresses the lock biasing member 66. The compression on the lock biasing member 66 increases the biasing force on the locking tab 54 from the lock biasing member 66. The increased biasing force from the lock biasing member 66 increases the total biasing forces from the lock biasing member 66 and the housing biasing member 50 to a force greater than the threshold force required to deform the head 64 of the locking tab 54 to move the locking mechanism 52 from the locked state to the unlocked state. When moving from the locked state to the unlocked state, the head 64 of the locking tab 54 deforms against the upper surface 61 of the head-receiving portion 60, where the deformation of the head 64 allows the locking tab 54 to pass through the shaft-receiving portion 58.

In the unlocked state, the housing biasing member 50 biases the housing 12 toward the use position in the A1 direction. The rotation of the housing 12 rotates the pivot gear 44, which is in contact with the damping gear 72. The damping gear 72 dampens the rotation of the pivot gear 44, thereby damping the movement of the housing 12.

When the housing 12 is in the use position, the ECU 80 determines the position of the housing 12 based on an output of the position sensor 82, where the ECU 80 activates the light source 20. The light source 20 provides light that reflects off of the reflector 24, directing light in the vehicle rear direction.

The input 88 may then be pressed by a user, thereby rotating the housing 12 from the use position toward the stowed position in the A2 direction, overcoming the biasing force of the housing biasing member 50. When moving from the unlocked state to the locked state, the head 64 of the locking tab 54 is deformed against the shaft-receiving portion 58 of the locking cavity 56, such that the head 64 passes through the shaft-receiving portion 58 into the head-receiving portion 60. The lock biasing member 66 then biases the head 64 toward the upper surface 61 of the head-receiving portion 60, where the head 64 rests against the upper surface 61. When the ECU 80 detects that the housing 12 is in the stowed position, the ECU 80 deactivates the light source 20.

The position of the housing 12 may additionally be changed via the actuator 84. The actuator 84 may be activated by the ECU 80 in response to an output from the vehicle state sensor 86 and/or the electrical input 90. The actuator 84 may be activated in response to the ECU 80 receiving an output from the vehicle state sensor 86 detecting that the truck 1 is moving slowly, and/or in a rearward direction. Additionally, the ECU 80 may activate the actuator 84 in response to an output from the electrical input 90 when a user presses the electrical input 90 with the housing 12 is in the stowed position. The actuator 84 rotates the pivot gear 44, and applies a force that overcomes the threshold force required to deform the head 64 against the locking cavity 56, thereby moving the locking mechanism 52 from the locked state to the unlocked state. The actuator 84 further pivots the housing 12 toward the use position in the A1 direction.

The actuator 84 may be activated to pivot the housing 12 from the use position to the stowed position in response to the vehicle state sensor 86 detecting that the truck 1 is no longer moving, or the pressing of the electrical input 90 by a user. The actuator 84 rotates the pivot gear 44, pivoting the housing 12 toward the stowed position. The actuator 84 applies a force above the threshold required to deform the head 64 against the shaft-receiving portion 58 of the locking cavity 56, such that the head 64 passes through the shaft-receiving portion 58 into the head-receiving portion 60.

From the above, it is to be appreciated that defined herein is a retractable light assembly for a tailgate, where the retractable light assembly pivots between a stowed position and a use position. The light assembly includes a housing, a pivot mechanism coupling the housing to the tailgate, a light source coupled to the housing, and a locking mechanism. While the retractable light assembly is depicted as being mounted on a tailgate of a truck, the disclosed retractable light assembly may be provided on any other type of vehicle, such as a passenger vehicle, an SUV, a semi-truck, a recreational vehicle, or the like. Additionally, while the retractable light assembly is depicted as being mounted to a rear of the truck, the retractable light assembly may be provided in any area of a vehicle, such as a front or side of the vehicle, or an interior of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A light assembly for a tailgate of a vehicle, comprising:
a housing including an exterior surface, the housing pivotally coupled to the tailgate for movement of the housing between a use positon and a stowed position, the housing including an exterior wall, an interior wall acutely angled with respect to the exterior wall, and a lens that extends between the exterior wall and the interior wall; and
a light source coupled to the housing,
in the use position the light source is positioned outside of the tailgate, and in the stowed position the exterior surface of the housing extends flush with a top surface of the tailgate and the light source is concealed within the tailgate.

2. The light assembly of claim 1, further comprising:
a pivot mechanism comprising:
a pivot shaft extending through the housing and the tailgate, wherein the housing pivots about the pivot shaft.

3. The light assembly of claim 2, further comprising:
an input, wherein the housing pivots about the pivot shaft between the use position and the stowed position upon actuation of the input.

4. The light assembly of claim 1, wherein the interior wall is positioned within the tailgate when the housing is in the stowed position, and the light source is positioned on the interior wall.

5. The light assembly of claim 1, further comprising:
a biasing member coupled to the housing, the biasing member is configured to bias the housing toward the use position.

6. The light assembly of claim 2, further comprising:
an electronic control unit electrically connected to the light source, the electronic control unit activates the light source when the housing is in the use position, and deactivates the light source when the housing is in the stowed position.

7. The light assembly of claim 6, wherein the pivot mechanism further comprises:
a pivot gear coupled to the pivot shaft; and
a damping gear in contact with the pivot gear, the damping gear is configured to dampen the movement of the housing.

8. The light assembly of claim 7, further comprising:
an actuator coupled to the pivot gear, the actuator is configured to actuate the pivot gear to pivot the housing between the stowed position and the use position.

9. The light assembly of claim 8, wherein the electronic control unit is electrically connected to the actuator, and the electronic control unit is configured to operate the actuator.

10. The light assembly of claim 9, further comprising:
a sensor electrically connected to the electronic control unit, the electronic control unit is configured to determine whether the vehicle is moving in a rearward direction based on an output from the sensor, and
the electronic control unit operates the actuator to pivot the housing to the use position in response to the electronic control unit determining that the vehicle is moving in the rearward direction.

11. A light assembly for a tailgate of a vehicle, comprising:
a housing including an exterior surface, the housing pivotally coupled to the tailgate for movement of the housing between a use positon and a stowed position, the housing including an exterior wall, an interior wall acutely angled with respect to the exterior wall, and a lens that extends between the exterior wall and the interior wall;
a light source coupled to the housing; and
a locking mechanism configured to move between a locked state and an unlocked state, wherein in the locked state, the locking mechanism inhibits movement of the housing, and in the unlocked state, the locking mechanism permits movement of the housing,
in the use position the light source is positioned outside of the tailgate, and in the stowed position the exterior surface of the housing extends flush with a top surface of the tailgate and the light source is concealed within the tailgate.

12. The light assembly of claim 11, further comprising:
a pivot mechanism comprising:
a pivot shaft extending through the housing and the tailgate, wherein the housing pivots about the pivot shaft.

13. The light assembly of claim 12, further comprising:
an input, wherein the housing pivots about the pivot shaft between the use position and the stowed position upon actuation of the input.

14. The light assembly of claim 11, further comprising:
a biasing member coupled to the housing, the biasing member is configured to bias the housing toward the use position.

15. The light assembly of claim 12, further comprising:
an electronic control unit electrically connected to the light source, the electronic control unit activates the light source when the housing is in the use position, and deactivates the light source when the housing is in the stowed position.

16. The light assembly of claim 15, wherein the pivot mechanism further comprises:
a pivot gear coupled to the pivot shaft; and
a damping gear in contact with the pivot gear, the damping gear is configured to dampen the movement of the housing.

17. The light assembly of claim 16, further comprising:
an actuator coupled to the pivot gear, the actuator is configured to actuate the pivot gear to pivot the housing between the stowed position and the use position, wherein the electronic control unit is electrically connected to the actuator, and the electronic control unit is configured to operate the actuator.

18. The light assembly of claim 17, further comprising:
a sensor electrically connected to the electronic control unit, the electronic control unit is configured to determine whether the vehicle is moving in a rearward direction based on an output from the sensor, and
the electronic control unit operates the actuator to pivot the housing to the use position in response to the electronic control unit determining that the vehicle is moving in the rearward direction.

19. A light assembly for a tailgate of a vehicle, comprising:
- a housing pivotally coupled to the tailgate for movement of the housing between a use positon and a stowed position; and
- a light source coupled to the housing, in the use position the light source is positioned outside of the tailgate, and in the stowed position the light source is positioned within the tailgate;
- a pivot mechanism comprising:
  - a pivot shaft extending through the housing and the tailgate, wherein the housing pivots about the pivot shaft;
  - a pivot gear coupled to the pivot shaft; and
  - a damping gear in contact with the pivot gear, the damping gear is configured to dampen the movement of the housing;
- an electronic control unit electrically connected to the light source, the electronic control unit activates the light source when the housing is in the use position, and deactivates the light source when the housing is in the stowed position;
- an actuator coupled to the pivot gear, the actuator is configured to actuate the pivot gear to pivot the housing between the stowed position and the use position;
- a sensor electrically connected to the electronic control unit, the electronic control unit is configured to determine whether the vehicle is moving in a rearward direction based on an output from the sensor,
- the electronic control unit is electrically connected to the actuator, and the electronic control unit is configured to operate the actuator, and
- the electronic control unit operates the actuator to pivot the housing to the use position in response to the electronic control unit determining that the vehicle is moving in the rearward direction.

* * * * *

UNITED STATES PATENT AND TRADEMARK OFFICE
CERTIFICATE OF CORRECTION

| | |
|---|---|
| PATENT NO. | : 11,679,712 B2 |
| APPLICATION NO. | : 17/218995 |
| DATED | : June 20, 2023 |
| INVENTOR(S) | : Skylar C. Watson |

It is certified that error appears in the above-identified patent and that said Letters Patent is hereby corrected as shown below:

On the Title Page

Column 2, item (57), Line(s) 4, delete "positon" and insert --position--, therefor.

In the Specification

In Column 1, Line(s) 26, delete "positon" and insert --position--, therefor.

In the Claims

In Column 7, Line(s) 18, Claim 1, delete "positon" and insert --position--, therefor.

In Column 8, Line(s) 11, Claim 11, delete "positon" and insert --position--, therefor.

In Column 9, Line(s) 4, Claim 19, delete "positon" and insert --position--, therefor.

Signed and Sealed this
Twenty-fifth Day of July, 2023

Katherine Kelly Vidal
*Director of the United States Patent and Trademark Office*